United States Patent [19]

Alway

[11] Patent Number: 4,898,721

[45] Date of Patent: Feb. 6, 1990

[54] HALOGEN ABSORBTION USING VEGETABLE OILS AND SURFACTANTS

[76] Inventor: Robert M. Alway, 2830 Radcliffe, Portage, Mich. 49081

[21] Appl. No.: 332,972

[22] Filed: Apr. 4, 1989

[51] Int. Cl.$^4$ .......................... B01D 53/34; B08B 3/04
[52] U.S. Cl. .......................................... 423/240; 55/71; 210/634; 210/915; 252/8.6; 134/42
[58] Field of Search .......................... 423/241; 55/71; 210/915, 634; 134/42; 252/8.6

[56] References Cited

U.S. PATENT DOCUMENTS

| | | | |
|---|---|---|---|
| 2,124,426 | 7/1938 | McKee | 423/503 |
| 3,655,801 | 4/1972 | Boyer et al. | 423/241 |
| 3,877,990 | 4/1975 | Laethem et al. | 423/241 |
| 4,018,880 | 4/1977 | Correla et al. | 423/503 |

FOREIGN PATENT DOCUMENTS 1132731 9/1982 Canada .

*Primary Examiner*—Jeffrey E. Russel
*Assistant Examiner*—Stephen G. Kalinchak

[57] ABSTRACT

A mixture of vegetable oil, surfactant, and sometimes water is used to remove halogens from a mixture. The vegetable oil-surfactant mixture is contacted with the halogen containing mixture whereupon the halogen is instantly and irreversably chemically bonded to the vegetable oil mixture. The vegetable oil mixture is then removed by an appropriate method. The method can be used for solid, liquid, or gaseous mixtures containing halogens, but is especially useful for treating gasses. Vegetable oils used include soybean, corn, sunflower, safflower, and linseed oils. Surfactants used include various soaps, detergents and their commercial mixtures.

5 Claims, No Drawings

HALOGEN ABSORBTION USING VEGETABLE OILS AND SURFACTANTS

BACKGROUND OF THE INVENTION

Halogens have been removed from gaseous mixtures using organic solvents to selectively absorb halogens for later recovery and by using alkaline materials such as lime or sodium hydroxide. These previous methods have several disadvantages. The reversably absorbing organic solvents must have a finite vapor pressure of halogen to be able to reevolve the absorbed gas. Further, the solvents used tend to be unusual materials with high cost and uncertain toxicity. The alkaline materials lack reversability of absorbtion and are both toxic and corrosive. This invention solves the problems of trace halogens in the treated material and toxicity in the scrubbing material. The scrubbing material in this invention comprises vegetable oil or unsaturated vegetable oil, surfactant or detergent, and water.

U.S. Pat. No. 3,877,990 uses a detergent foam to blanket released chlorine gas but not absorb it as in the current invention. U.S. Pat. No. 2,124,426 reacts halogens with unsaturated hydrocarbons, as do U.S. Pat. Nos. 3,655,801 and 4,018,880, but none of these patents combine the use of surfactant as in the current invention and none use vegetable oil.

DESCRIPTION OF THE INVENTION

The current invention is a process of absorbing halogens using a composition of matter comprising vegetable oil, surfactant, and water.

Halogen in the solid, liquid, or gaseous state, pure or mixed with other material, is contacted with the absorbing composition in either bulk or dispersed form to chemically combine with and so remove the halogen. The absorbing composition comprises vegetable oil and surfactant. The absorbing composition comprises soybean oil, corn oil, sunflower oil, safflower oil, or peanut oil and surfactant. Soybean oil, corn oil, sunflower oil safflower oil, and peanut oil all are vegetable oils of commerce. The absorbing composition comprises vegetable oil and soap, detergent, anionic surfactant, cationic surfactant, nonionic surfactant, or silicone based surfactant. Soap, detergent, anionic surfactant, cationic surfactant, nonionic surfactant, and silicone based surfactant are all surfactants of commerce. The absorbing composition comprises a mixture of vegetable oils and a mixture of surfactants.

EXAMPLES 10 ml of corn oil and 25 ml of commercial dishwashing detergent were placed in a 10 L bottle containing bromine vapor and air. The bromine was immediately absorbed creating a partial vacuum in the bottle and the disappearance of the characteristic bromine color and odor.

An approximately equal mixture of surfactant and vegetable oil was placed on a fabric sample containing iodine. The color of elemental iodine disappeared immediately.

Mixtures of the trade named DOW CORNING 193 silicone surfactant was mixed with several vegetable oils including; soybean oil, corn oil, sunflower oil, safflower oil, and peanut oil. All mixtures absorbed chlorine.

The above examples are illustrative and cannot be considered the best mode for all purposes. For example, in a high temperature gas stream more water may be added to the absorbing mixture as a coolant. Another example would be for use in shampoo to remove swimming pool chlorine where a small amount of vegetable oil relative to the amount of surfactant would be required. One skilled in the art could easily determine the best formulation for a particular purpose.

Removing the waste halogen absorbant depends on the particular use. In dilute solutions it may be washed away, in concentrated solutions it may be collected and disposed of by other means.

Halogens consist of fluorine, chlorine, bromine, iodine, and astatine. The halogens tested for use with the current invention comprise chlorine, bromine, and iodine.

I claim:

1. A process of absorbing halogens comprising; contacting a mixture containing vegetable oil and surfactant with halogen, pure or mixed with other material.

2. A process according to claim 1, wherein the vegetable oil comprises soybean oil, corn oil, sunflower oil, safflower oil, or peanut oil.

3. A process according to claim 1, wherein the surfactant comprises soap, detergent, anionic surfactant, cationic surfactant, nonionic surfactant, or silicone based surfactant.

4. A process according to claim 1, wherein the halogen comprises chlorine, bromine, or iodine.

5. A process according to claim 1, wherein the mixture additionally contains water.

* * * * *